United States Patent [19]

Braeger

[11] 4,286,355

[45] Sep. 1, 1981

[54] METHOD OF FILLETING FISH AND A FILLETING MACHINE FOR PERFORMING THIS METHOD

[75] Inventor: Horst K. H. Braeger, Lübeck, Fed. Rep. of Germany

[73] Assignee: Nordischer Maschinenbau Rud. Baader GmbH & Co. KG, Lübeck, Fed. Rep. of Germany

[21] Appl. No.: 44,713

[22] Filed: Jun. 1, 1979

[51] Int. Cl.³ .............................................. A22C 25/16
[52] U.S. Cl. .......................................... 17/46; 17/57
[58] Field of Search ........................... 17/56, 57, 46, 61

[56] References Cited

U.S. PATENT DOCUMENTS

| 3,319,287 | 5/1967 | Michael | 17/46 |
| 4,008,509 | 2/1977 | Braeger et al. | 17/56 |
| 4,056,866 | 8/1977 | Wenzel | 17/57 |

FOREIGN PATENT DOCUMENTS 2460447 7/1976 Fed. Rep. of Germany .............. 17/57

Primary Examiner—Willie G. Abercrombie
Attorney, Agent, or Firm—Edward F. Levy

[57] ABSTRACT

A fish filleting machine comprises a conveyor for transporting the fish tail forwards, belly filleting knives, back filleting knives, rib knives, first severing knives for the severing through of the flesh strip, and second severing knives for the severing of the fillets at the tail root of the fish. A closed guide track for the backbone of the fish is arranged between the belly filleting knives or the back filleting knives and the second severing knives. The first severing knives lie between the belly filleting knives or the back filleting knives and the rib knives and are connected with control means, which are actuated synchronously with the conveyor and bring the first severing knives into a setting crossing the guide track before and arrival of the end of the abdominal cavity of the respective fish.

5 Claims, 3 Drawing Figures

METHOD OF FILLETING FISH AND A FILLETING MACHINE FOR PERFORMING THIS METHOD

BACKGROUND OF THE INVENTION

1. Field of the Invention

The present invention relates to a method of filleting of fish comprising the steps of conveying the fish tail forwards and cutting free the fillets by performing belly filleting cuts, back filleting cuts, and rib cuts and severing the fillets thus cut free from the bone skeleton of the fish by means of severing cuts, and to a filleting machine for performing the process, comprising conveyor means to convey fish tail forwards, belly filleting knife means, a back filleting knife means, rib cutting knife means, first severing knife means for severing through flesh of the fish, second severing knife means for severing the fish at the tail root thereof.

2. Description of Prior Art

In known processes for filleting fish, rib cuts start at the abdominal cavity end at the side of the tail and leave a trough-like depression at this point in every fillet. The piece of flesh cut out of the fillet remains on the bone skeleton and represents a measurable loss of flesh yield. The trough-like depression comes into being through the parts of the fish connected with the back-bone through a respective tape of flesh, which remains uncut laterally beside the vertebrae of the back-bone between belly filleting knives, and back-filleting knives, disposed closely behind the end of the abdominal cavity, do not let themselves be raised exactly into the planes of the rib knives. German Letters Pat. No. 943 612 discloses a fish filleting machine comprising a severing apparatus arranged behind the rib knives severing through these flesh tapes. However, this severing apparatus is arranged behind the rib knives, so that these have to cut into the unsevered band or strip of flesh to the sides of the vertebral column.

SUMMARY OF THE INVENTION

Object of the Invention

It is an essential object of the present invention to enable a defined severing of the fillets to the sides of the vertebrae closely up to the vertebral appendages in the region of the end of the abdominal cavity in the filleting of fish.

According to one aspect of the present invention there is provided a method of filleting fish, comprising the steps of conveying the fish tail forwards and cutting free the fillets by performing belly filleting cuts, back filleting cuts, rib cuts and severing the fillets thus cut free from the bone skeleton of the fish by means of severing cuts, the fillets, after the performance of the belly filleting cuts and the back filleting cuts, being detached in the region of the abdominal cavity end by severing through a flesh strip connecting the fillets with the vertebrae, and being cut free from the lateral vertebral projections (or appendages) and ribs in the region of the abdominal cavity by means of the rib cuts and thereafter completely severed from the bone skeleton by severing through the flesh strip from the tail root to the place of detachment behind the abdominal cavity.

By such relatively short first detachment cuts merely in the region of the abdominal cavity end of the fish the fillets are no longer obstructed against deformation, and the rib knives can therefore produce a smooth cut. The thus achieved result is a greater flesh yield.

According to another aspect of the present invention there is provided a filleting machine comprising conveyor means to convey fish tail forwards, belly filleting knives, back filleting knives, rib cutting knives, first severing knives for severing trough flesh of the fish, second severing knives for severing the fish at the tail root thereof, closed guide means for guiding the back-bone of the fish and disposed between the second severing knives and at least one of the filleting knives and the back filleting knives, the first severing knives being disposed between the rib knives and at least one of the belly filleting knives and the back filleting knives and being connected with control means actuable synchronously with the conveyor means to dispose the first severing knives at a position at which they traverse the guide means before arrival of the abdominal cavity end of the fish.

With such a filleting machine it is possible to make short severing or detachment cuts merely in the region of the belly cavity end so as to let the rib cuts extend smoothly and without depression in prolongation of the bely filleting cuts and thus to attain an increased yield in fish flesh.

Preferably the first severing knives may be displaceable against a spring force in the conveying direction of the fish. This enables the flesh band to be severed through up to the last vertebral projections at the abdominal cavity end.

The conveyor means may expediently be provided with spaced entraining elements or push saddles each adapted to engage a respective fish. This enables control of the first severing knives to be facilitated and such control means to be simple.

Advantageously the rib knives may comprise scraping or shaving tools. This enables the rib cuts to be performed smoothly and flesh to be saved especially since the fillets connected with the fish skeleton at the tail root are held in a stretched condition.

BRIEF DESCRIPTION OF THE DRAWING

Other and further objects of the present invention will be apparent from the following description and claims and are illustrated in the accompanying drawing which by way of illustration shows a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings.

DESCRIPTION OF THE PREFERRED EMBODIMENT

Figure 1:
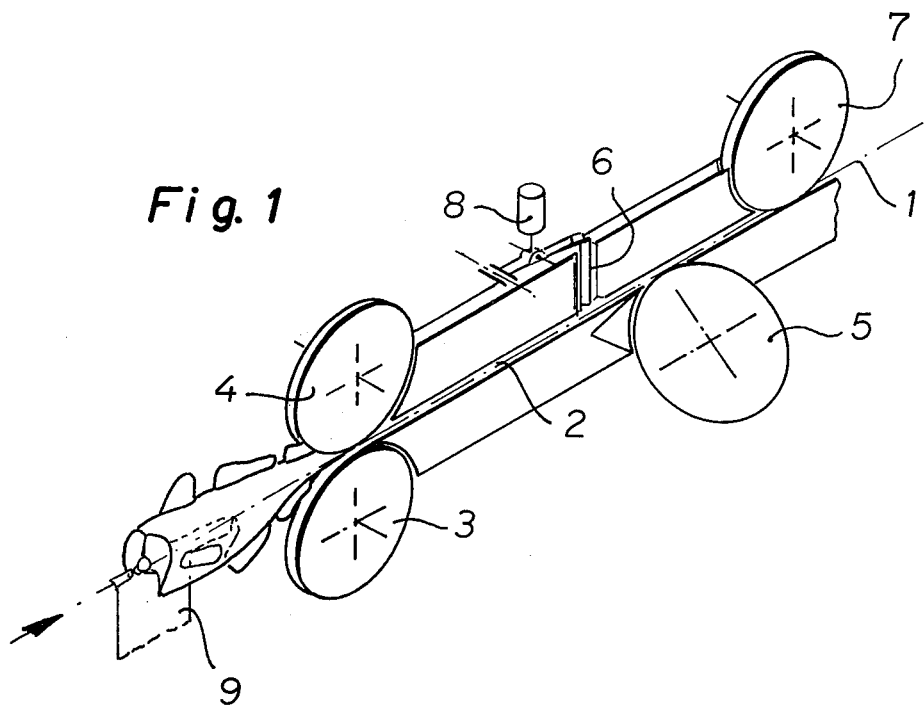
FIG. 1 shows an axonometric illustration of part of a fish filleting machine embodying the present invention.
Figure 2:
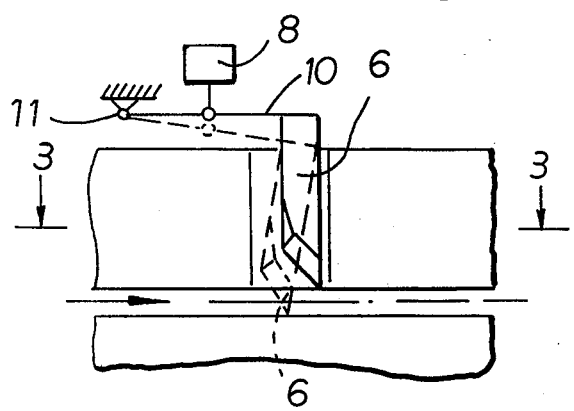
FIG. 2 is an enlarged side elevational view of the severing knife assembly shown in FIG. 1.
Figure 3:
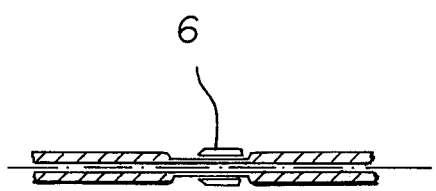
FIG. 3 is a longitudinal section taken along line 3—3 of FIG. 2.

Referring to the accompanying drawing, deflecting wheels of an endless conveyor 1 are journalled in a frame (not shown) and are drivable in the direction of the arrow. The conveyor 1 carries push saddles 9 on which fish saddled by their abdominal cavities can be transported at fixed spacings. The push saddles 9 are advanced by the conveyor 1 in a guide path or track 2 which, in a known manner, comprises two upper and two lower bone guides (not designated) and serves for the passage of the vertebral column of the fish. At the start of the guide track 2 and underneath the same a pair of belly filleting knives 3 are arranged at its upstream end and a pair of rib knives 5 at its downstream end. Above the guide track 2, a pair of back filleting knives 4 are arranged in the proximity of the belly filleting knives 3 and a pair of severing knives 7 at the downstream end of the guide track 2 for the severing of the fillets from the bone skeleton in their tail region. A pair of severing knives 6 which are like a graving, chisel or planing tool and which are raisable and lowerable for severing through the flesh strips are arranged above the guide track 2 between the back filleting knives 4 and rib knives 5 and connected with control means 8 so as to be driven synchronously with the conveyor. The severing knives 6 depend vertically from an arm 10 which is pivotally mounted for movement about a horizontal axis 11. The control means 8 is connected to an intermediate point on arm 10, as shown, for elevating and lowering the knives 6.

The method of operation of the filleting machine is as follows:

A fish, opened at least in its abdominal cavity and degutted, is so saddled by its abdominal cavity on one of the push saddles 9 that its tail points in the direction of motion of the conveyor 1. When the fish is fed by guide means (not shown) to the belly filleting knives 3, these produce two incisions to both sides of the belly spokes of the bone structure and extending from the abdominal cavity end up to the end of the abdominal cavity. At the same time, the back filleting knives 4 also produce incisions, extending from the tail root up to the neck, to both sides of the back spokes. After the passage of the tail end part of the fish and before the abdominal cavity end of the fish reaches the severing knives 6, these are moved downwardly and cross the path of motion 2 of the fish. They penetrate by their points both the flesh bands not severed by the belly filleting knives 3 and the back filleting knives 4 and thus connecting the fillets with the spinal column and sever these through up to the end of the abdominal cavity. After reaching the abdominal cavity, they are deflected upwardly by the lateral vertebral projections and prolong the incisions made in the fish by the back filleting knives 4, onto the upper sides of the lateral vertebral projections. On reaching the rib knives 5, known per se spreaders or cutting supports, disposed before the cutting edges of the rib knives, steer both the fillets upwardly in the region of the abdominal cavity end, and the rib knives 5 sever the fillets off from the lateral vertebral projections and ribs without their cutting edges penetrating into the fillets and producing a depression each time. On reaching the severing knives 7, the fillets are then severed at their tail root and to both sides of the back bone.

The above described embodiment of the present invention enables fillets to be produced with a greater flesh yield and smoother appearance than hitherto.

What is claimed is:

1. A method of filleting fish comprising the steps of:
conveying the fish tail forwards toward a series of cutting knives,
performing back filleting cuts through the upper portion of the fish along the length thereof, and performing belly filleting cuts through the lower portion of the fish in the tail portion thereof up to a location close to the rear end of the belly cavity of the fish, with said back filleting cuts and belly filleting cuts terminating short of the vertebral column of the fish and leaving a flesh strip on both sides of the vertebral column,
thereafter performing first severing cuts through the upper portion of the fish along the sides of the vertebral column in a region rearwardly of the tail end of the cavity of the fish, to sever said flesh strip from both sides of the vertebral column in said region,
thereafter performing rib cuts through the sides of the fish through said region and above the length of the belly cavity, with said rib cuts extending upwardly to the ends of the back filleting cuts,
and finally performing second severing cuts along both sides of the vertebral column from the tail root of the fish to the end of the belly cavity to sever the fillets completely from the skeleton of the fish.

2. A method of filleting fish according to claim 1 in which said severing cuts extend longitudinally of the fish from a point spaced a short distance rearwardly from the tail end of the belly cavity, up to the tail end of the belly cavity.

3. A fish filleting machine comprising conveyor means to convey fish tail forwards, belly filleting knife means, back filleting knife means, rib cutting knife means, first severing knife means for severing through flesh of the fish, second severing knife means for severing the fish at the tail root thereof, wherein closed guide means for guiding the backbone of the fish are disposed between said second severing knife means and at least one of said back and belly filleting knife means, said first severing knife means being disposed between said rib knife means and at least one of said back and belly filleting knife means and being connected with control means actuable synchronously with said conveyor means to dispose said first severing knife means at a position at which they traverse said guide means before the arrival of the belly cavity end of the fish.

4. A filleting machine as claimed in claim 3 wherein said first severing knife means is biased in the conveying direction of the fish.

5. A filleting machine as claimed in claim 3 wherein the conveyor means is provided with spaced entraining elements each adapted to engage and convey a respective fish.

* * * * *